(12) United States Patent
Maeda et al.

(10) Patent No.: US 6,783,286 B2
(45) Date of Patent: Aug. 31, 2004

(54) MONITORING CAMERA WITH DETACHABLE LENS HOUSING

(75) Inventors: Haruo Maeda, Tsushima (JP); Kenichi Maruyama, Okazaki (JP); Hirokazu Mitsugi, Nagoya (JP)

(73) Assignee: Elmo Co., Ltd., Aichi (JP)

( * ) Notice: Subject to any disclaimer, the term of this patent is extended or adjusted under 35 U.S.C. 154(b) by 0 days.

(21) Appl. No.: 10/615,823

(22) Filed: Jul. 9, 2003

(65) Prior Publication Data

US 2004/0042779 A1 Mar. 4, 2004

(30) Foreign Application Priority Data

Sep. 2, 2002 (JP) ........................................ 2002-256356

(51) Int. Cl.⁷ ........................ G03B 17/00; H04N 5/225; H04N 7/18

(52) U.S. Cl. ........................ 396/427; 396/535; 348/143; 348/373

(58) Field of Search ............................ 396/27, 29, 427, 396/535; 348/81, 143, 158, 373, 374, 376

(56) References Cited

U.S. PATENT DOCUMENTS 5,822,622 A * 10/1998 Inoue .......................... 396/27

* cited by examiner

*Primary Examiner*—W. B. Perkey
(74) *Attorney, Agent, or Firm*—Koda & Androlia

(57) ABSTRACT

A monitoring camera includes a camera housing, a camera body housed in the camera housing, a lens barrel protruding from the camera housing, and a lens housing mounted for protecting the lens barrel. The lens housing is detachably mounted on the camera housing by bayonet engagement.

2 Claims, 5 Drawing Sheets

MONITORING CAMERA WITH DETACHABLE LENS HOUSING

BACKGROUND OF THE INVENTION

1. Field of the Invention

This invention relates to a monitoring camera.

2. Description of the Related Art

Conventional monitoring cameras comprise a camera housing, a camera body housed in the camera housing and a lens barrel protruding from the camera housing. When the lens barrel protrudes from the camera body, a zooming knob and a focusing knob can be operated even after the monitoring camera has been installed.

However, the lens barrel protruding from the camera housing is not only undesirable from the point of protection of the lens barrel but also devoid of sense of unity from the point of appearance design.

SUMMARY OF THE INVENTION

Therefore, an object of the present invention is to provide a monitoring camera in which the lens barrel can be protected and has a sense of unity with respect to the appearance design, and a zooming operation and focusing operation can easily be carried out.

To achieve the object, the invention provides a monitoring camera comprising a camera housing, a camera body housed in the camera housing, a lens barrel protruding from the camera housing, and a lens housing provided for protecting the lens barrel, wherein the lens housing is detachably mounted on the camera housing by bayonet engagement.

The lens housing is detachably attached to the camera housing by the bayonet mounting mechanism in the above-described monitoring camera. Consequently, the lens barrel can be protected by the lens housing and furthermore, the lens barrel has a sense of unity when the camera housing and the lens housing are unified or harmonized in the design.

In a preferred form, the monitoring camera further comprises a zooming knob and a focusing knob each protruding from an outer periphery of the lens barrel. Consequently, since the lens housing is detached from the camera housing, the zooming and focusing knobs provided on the lens housing can easily be operated.

The invention also provides a monitoring camera comprising a camera housing having an opening, a camera body housed in the camera housing, a lens barrel protruding from the camera housing, a lens housing formed integrally with the camera housing for protecting the lens barrel, the lens housing having a side peripheral wall and an opening formed in the peripheral watt thereof, a cylindrical cover turnably fitted in the opening of the camera housing so as to cover the lens barrel, the cover having a side peripheral wall and an opening formed in the peripheral wall, the cover being turned so that the openings of the lens housing and the cover are placed one upon the other.

In the above-described monitoring camera, the cover covering the lens housing formed integrally with the camera housing is turned so that the openings of the lens housing and the cover are placed one upon the other. Consequently, the lens barrel has a sense of unity when the camera housing and the lens housing are unified or harmonized in the design. Furthermore, since a configuration of the opening formed in the cover appears, the monitoring camera presents a unique design. Additionally, the lens housing can be protected by the camera housing and the cover.

In another preferred form, the monitoring camera further comprises a zooming knob and a focusing knob each protruding from an outer periphery of the lens barrel into the opening of the lens housing. In this case, too, the zooming and focusing knobs provided on the lens housing can easily be operated for each adjustment when the cover is turned so that the openings of the lens housing and the cover are placed one upon the other.

BRIEF DESCRIPTION OF THE DRAWINGS

Other objects, features and advantages of the present invention will become clear upon reviewing the following description of embodiments, made with reference to the accompanying drawings, in which.

DETAILED DESCRIPTION OF THE INVENTION

Figure 1:
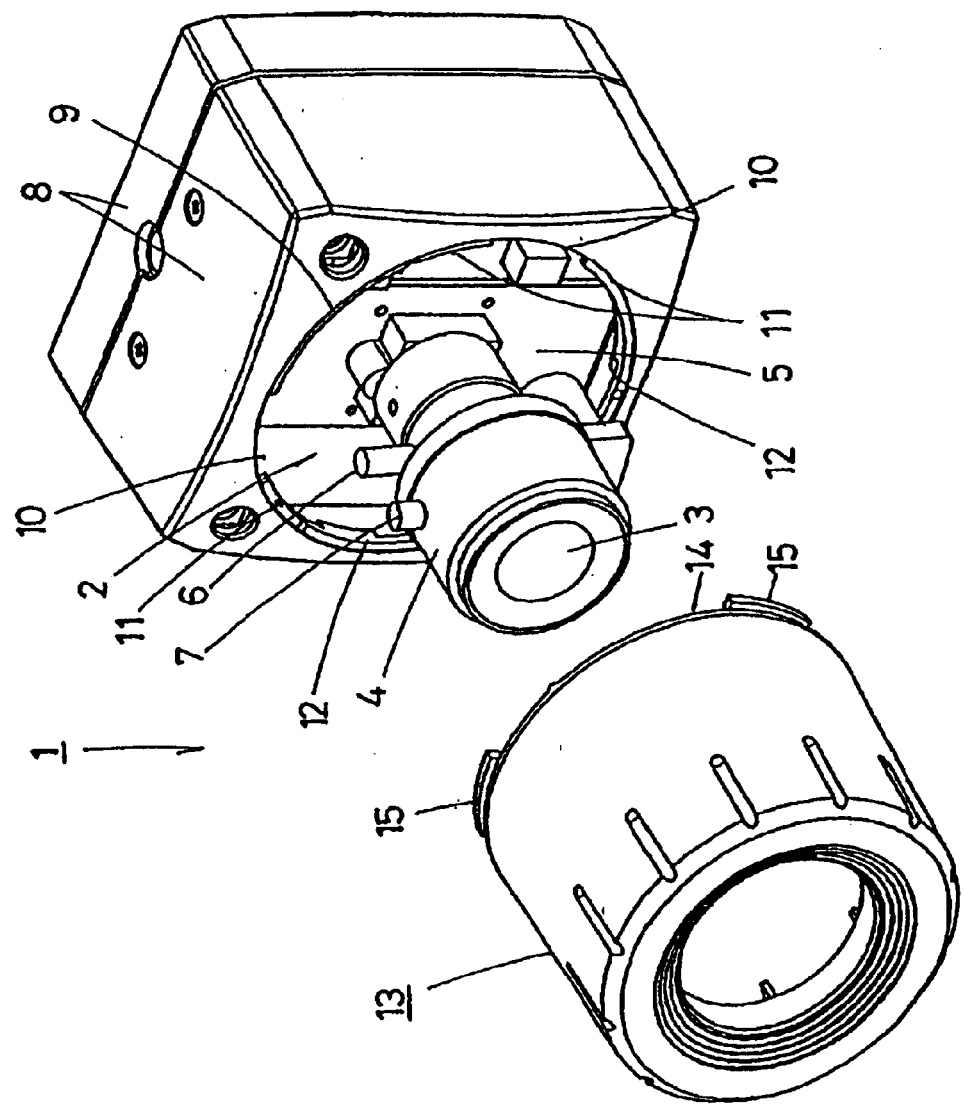
FIG. 1 is an exploded perspective view of a monitoring camera of one embodiment in accordance with the present invention with a lens housing being detached.
Figure 2:
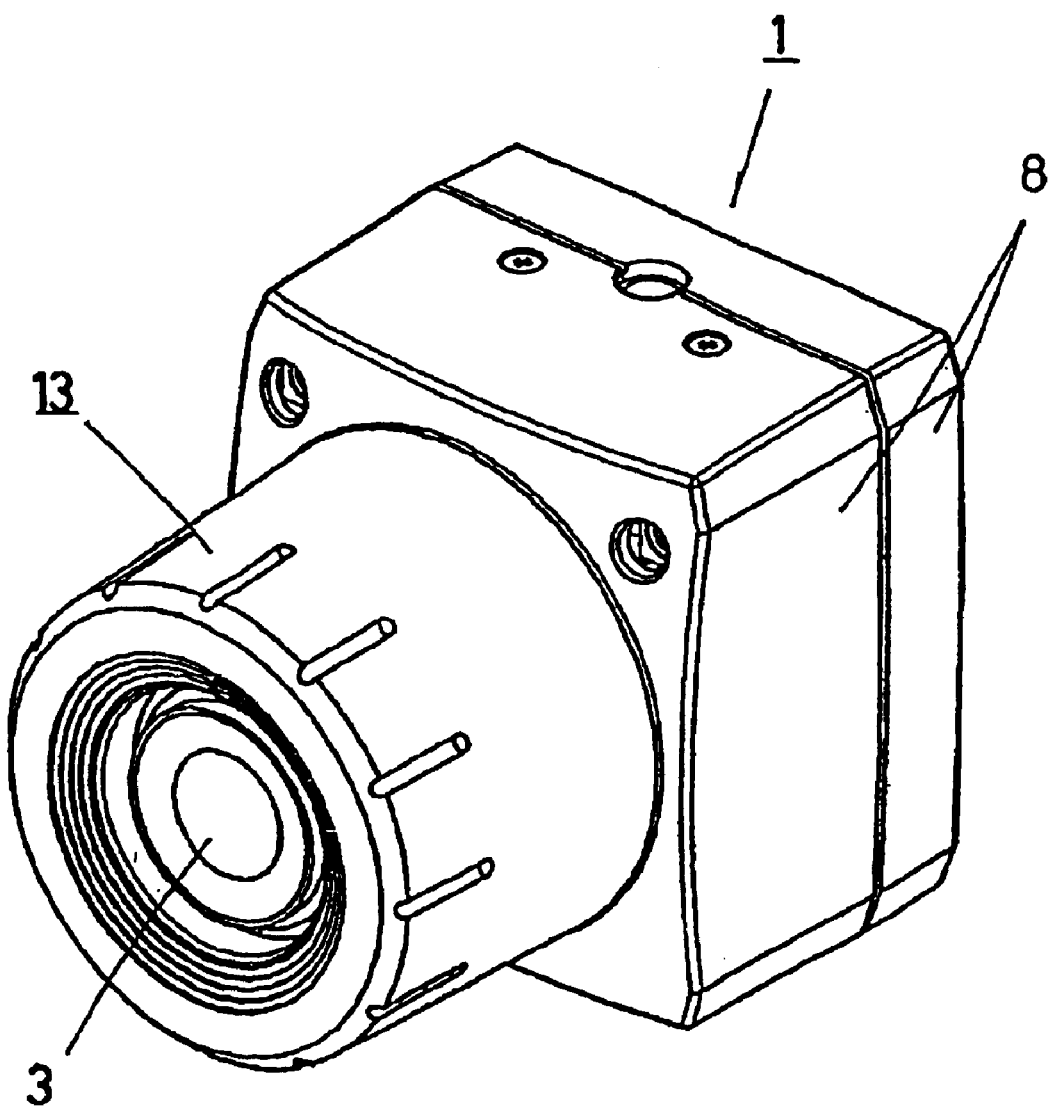
FIG. 2 is a perspective view of the monitoring camera.

One embodiment of the present invention will be described with reference to FIGS. 1 and 2. Referring to FIG. 1, a monitoring camera 1 is shown with a lens housing 13 being detached. The monitoring camera 1 includes a lens barrel 4 to which an image pickup lens 3 is mounted and a camera body 5 on which a CCD image pickup element, an image pickup control circuit, etc. are mounted. A zooming knob 6 and a focusing knob 7 are mounted on the lens barrel 4.

The camera body 5 is fixed in a camera housing 8. The camera housing 8 is molded from a synthetic resin and has a mounting hole 9 formed in a front wall thereof. An opening edge of the mounting hole 9 has three generally arc engagement portions 11 formed integrally with the camera housing 8 at intervals of 120 degrees. The opening edge of the mounting hole 9 further has three insertion recesses 10 formed between the engagement portions 11 at intervals of 120 degrees. Each engagement portion 11 has a stopper 12 projecting, at a generally middle position of the adjacent recess 10, toward an inside of the front wall of the camera housing 8. A cylindrical lens housing 13 is attached to the mounting hole 9 so as to cover the lens barrel 4 to protect it. The lens housing 13 is molded from a synthetic resin. The lens housing 13 has a rear end opening 14 further having an opening edge. Three engagement claws 15 are formed at intervals of 120 degrees integrally with the lens housing 13 so as to be inserted into the engagement recesses 10 respectively.

The lens housing 13 is placed so as to cover the lens barrel 4 and the engagement claws 15 are inserted into the recesses 10 of the mounting hole 9 of the camera housing 8 respectively so that the rear end of the opening 14 is abutted against the front end faces of the respective arc engagement portions 11. When the lens barrel 13 is then turned clockwise or counterclockwise, each claw 15 is moved to the backside of the engagement portion 11, engaging the same. Each claw 15 further abuts the stopper 12, thereby limiting further turn of the lens housing 13. Thus, the lens housing 13 is attached to the camera housing 8 by bayonet engagement (bayonet mounting structure).

In the above-described monitoring camera, the lens housing 13 is detachably attached to the camera housing 8 by the bayonet mounting mechanism. Consequently, the lens barrel 4 can be protected by the lens housing 13 and furthermore, the lens barrel 4 has a sense of unity when the camera housing 8 and the lens housing 13 are unified or harmonized in the design. Furthermore, since the lens housing 13 is easily detached from the camera housing 8, the zooming knob 6 and the focusing knob 7 can easily be operated so that an image is zoomed in or out and so that the lens is focused.

Figure 3:
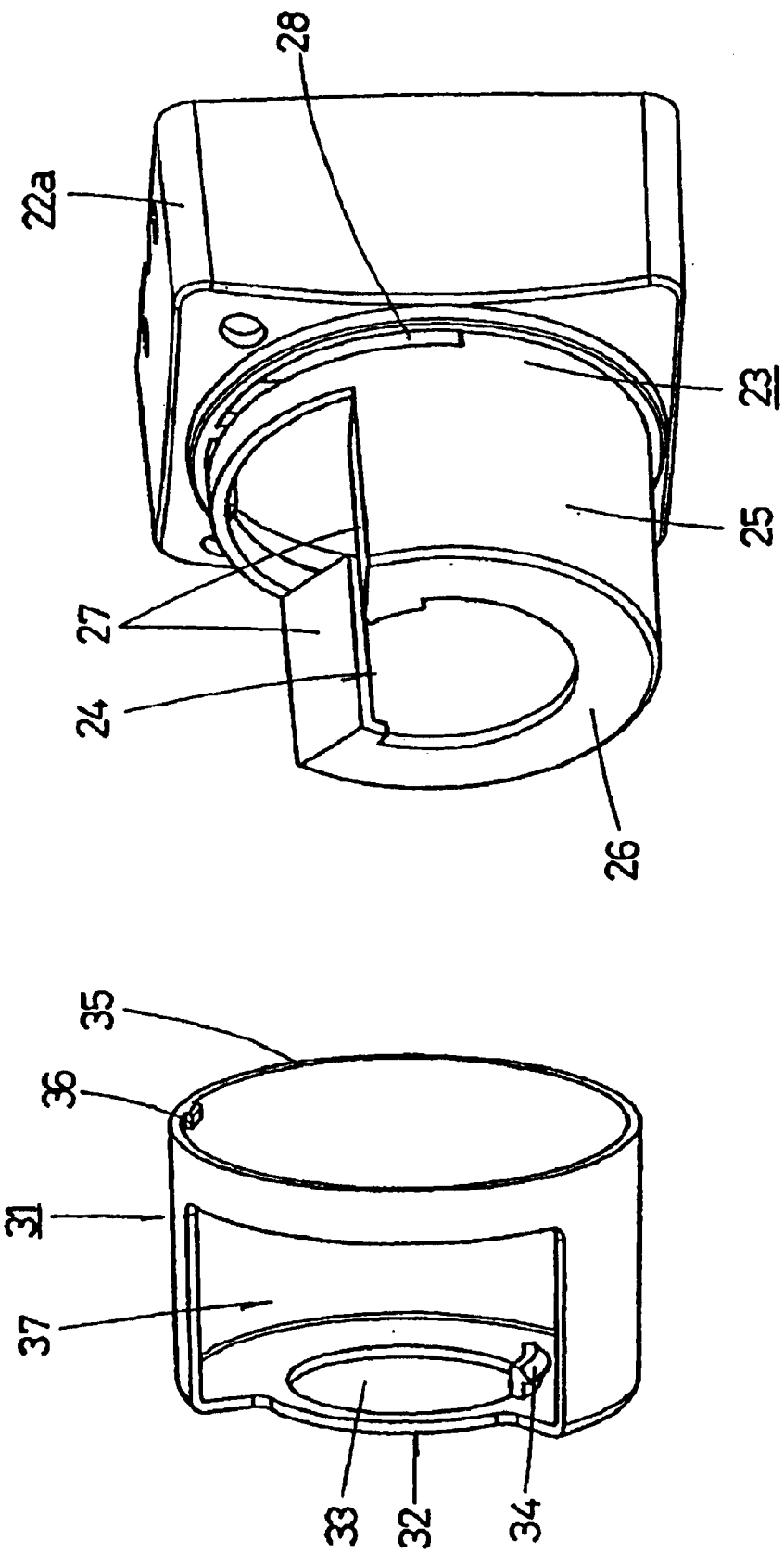
FIG. 3 is an exploded perspective view of the monitoring camera of another embodiment in accordance with the invention.
Figure 4:
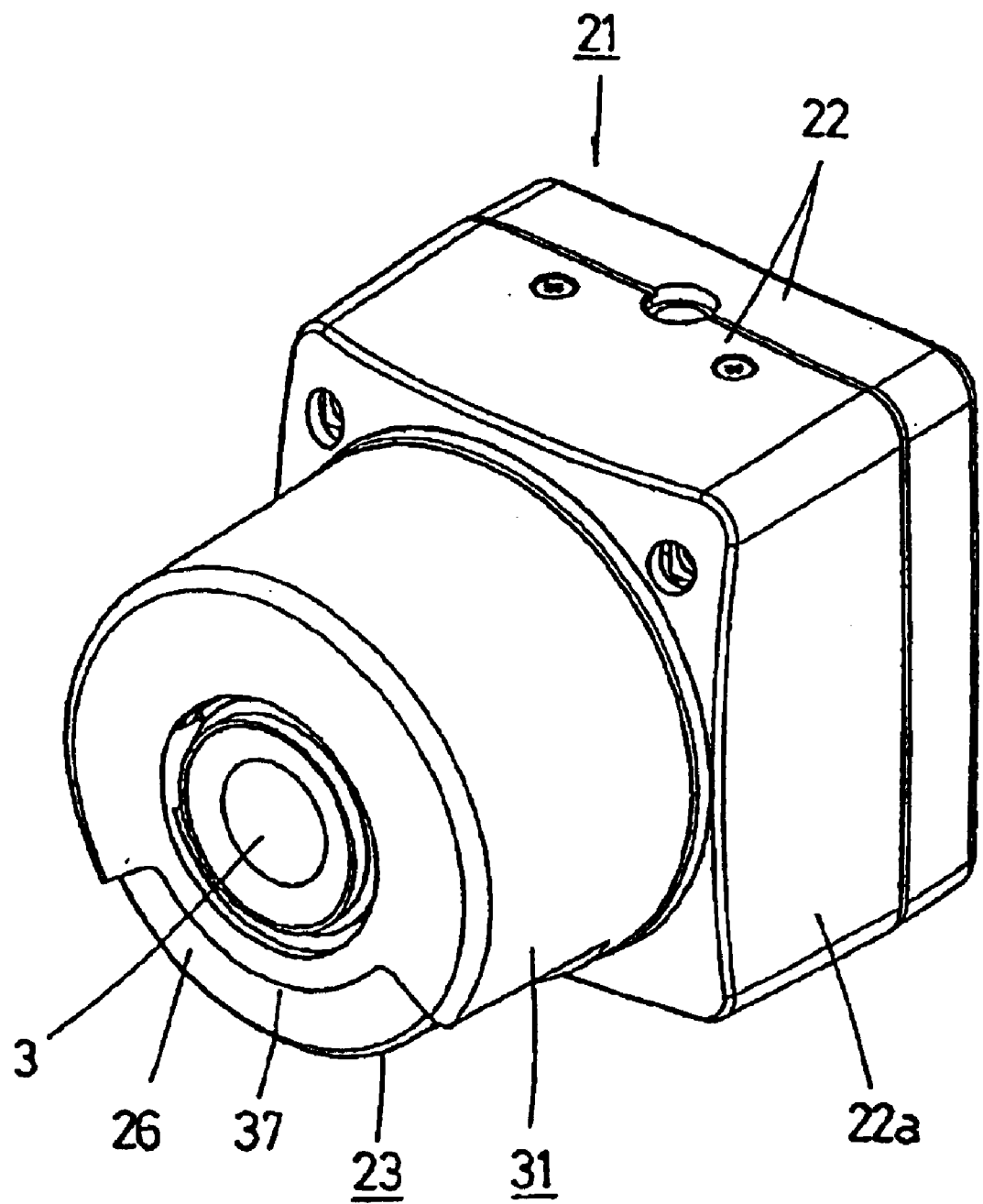
FIG. 4 is a perspective view of the monitoring camera.
Figure 5:
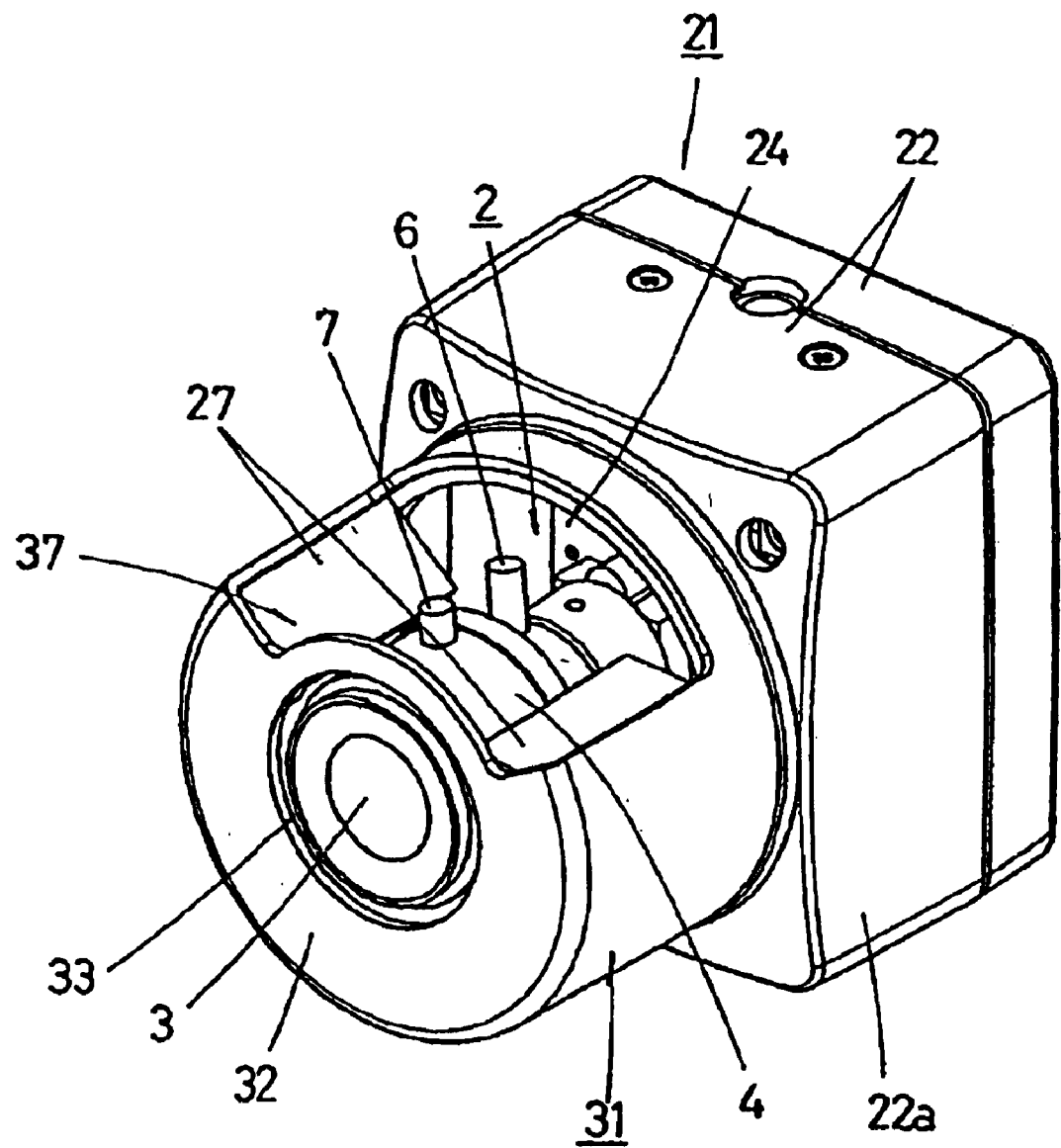
FIG. 5 is a perspective view of the monitoring camera with the cover having been turned.

FIGS. 3 to 5 illustrate another embodiment of the invention. The monitoring camera 21 is similar to the monitoring camera 1 as described above. The camera housing 22 molded from the synthetic resin is provided for fixing the camera body 5 and includes a front half 22a with which the cylindrical lens housing 23 is formed integrally.

The lens housing 23 includes an incomplete cylindrical portion 25 with an opening 24 formed by cutting off a part of the peripheral wall thereof, as shown in FIG. 3. The opening 24 extends from an axial middle to the front end of the lens housing 23. The incomplete cylindrical portion 25 of the lens housing 23 has a front end with an inwardly directed flange 26 formed integrally therewith. The incomplete cylindrical portion 25 further has a pair of covers 27 axially extending and opposed to each other with the opening 24 located therebetween. The zooming knob 6 and the focusing knob 7 mounted on the lens barrel 4 protrude into the space between covers 27. The lens housing 23 includes a guide groove 28 extending substantially half round the rear end of the circumferential wall thereof.

A cylindrical cover 31 molded from a synthetic resin has a front end 32 formed with a front opening 33 and a rear opening 35. The cover 31 has an engaging claw 34 formed integrally on an inner circumferential wall of the edge of the opening 33. The cover 31 further has an engaging claw 36 formed integrally on the edge of the rear opening 35. Additionally, the cover 31 has an opening 37 formed by cutting off a part of the circumferential wall thereof and a part of the front end 32 continuously.

The cover 31 is put over the lens housing 23 so as to cover the latter. The engaging claw 34 is then fitted with the backside of the flange 26 of the lens housing 23, whereas the engaging claw 36 is fitted into the guide groove 28 so as to engage the latter. As a result, the cover 31 is turnably mounted on the camera housing 22 so as to surround the lens housing 23. The engaging claw 36 in engagement with the guide groove 28 abuts against the end of the groove 28, thereby limiting turn of the cover 31 to an angle of about 180 degrees. The cover 31 is turned so that the opening 24 of the lens housing 23 and the opening 37 of the cover 31 are placed one upon the other, as shown in FIG. 5. The zooming and focusing knobs 6 and 7 mounted on the lens barrel 4 project into a space defined between the covers 27.

In the monitoring camera of the second embodiment, the cylindrical cover 31 covers the lens housing 23 formed integrally with the front half 22a of the camera housing 22. The cover 31 is turned so that the opening 24 of the lens housing 23 and the opening 37 of the cover 31 are placed one upon the other. Consequently, the appearance design of the monitoring camera has a sense of unity when the camera housing 23 and the cover 31 molded from the synthetic resin are unified or harmonized in the design. Furthermore, since a configuration of the opening 37 formed in the cover 31 appears, the monitoring camera presents a unique design. Additionally, the lens barrel 4 can be protected by the camera housing 23 and the cover 31, and the zooming and focusing knobs 6 and 7 mounted on the lens barrel 4 can easily be operated for each adjustment when the cover 31 is turned so that the openings 24 and 37 of the lens housing 23 and the cover 31 are placed one upon the other.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A monitoring camera comprising:

a camera housing having an opening;

a camera body housed in the camera housing;

a lens barrel protruding from the camera housing;

a lens housing formed integrally with the camera housing for protecting the lens barrel, the lens housing having a side peripheral wall and an opening formed in the peripheral wall thereof;

a cylindrical cover turnably fitted in the opening of the camera housing so as to cover the lens barrel, the cover having a side peripheral wall and an opening formed in the peripheral wall, the cover being turned so that the openings of the lens housing and the cover are placed one upon the other.

2. A monitoring camera according to claim 1, further comprising a zooming knob and a focusing knob each protruding from an outer periphery of the lens barrel into the opening of the lens housing.

* * * * *